(12) United States Patent
Qu et al.

(10) Patent No.: US 7,521,835 B2
(45) Date of Patent: Apr. 21, 2009

(54) PERMANENT MAGNET MACHINE WITH WINDINGS HAVING STRAND TRANSPOSITION

(75) Inventors: Ronghai Qu, Clifton Park, NY (US); Patrick Lee Jansen, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 379 days.

(21) Appl. No.: 11/426,756

(22) Filed: Jun. 27, 2006

(65) Prior Publication Data

US 2007/0296299 A1   Dec. 27, 2007

(51) Int. Cl.
*H02K 1/00* (2006.01)

(52) U.S. Cl. ...................................................... 310/184

(58) Field of Classification Search ................ 310/184, 310/266, 156.01, 156.37, 156.57, 112, 114; 290/44, 55
See application file for complete search history.

(56) References Cited

U.S. PATENT DOCUMENTS

| | | | |
|---|---|---|---|
| 3,760,493 A | 9/1973 | Snively | |
| 3,851,231 A * | 11/1974 | Eastham et al. | 318/135 |
| 4,028,572 A | 6/1977 | Baltisberger | |
| 4,384,227 A | 5/1983 | Kawai | |
| 4,445,105 A | 4/1984 | Wehl | |
| 4,577,139 A * | 3/1986 | Reinhardt et al. | 318/400.41 |
| 4,617,725 A * | 10/1986 | Holter et al. | 29/598 |
| 4,678,931 A | 7/1987 | Olsen et al. | |
| 5,175,396 A * | 12/1992 | Emery et al. | 174/36 |
| 5,270,598 A | 12/1993 | Holly, III et al. | |
| 5,323,079 A | 6/1994 | Nieves et al. | |
| 6,201,333 B1 | 3/2001 | Furst | |
| 6,284,979 B1 | 9/2001 | Malozemoff et al. | |
| 6,590,312 B1 * | 7/2003 | Seguchi et al. | 310/266 |
| 6,703,752 B2 | 3/2004 | Haldermann | |
| 6,924,574 B2 * | 8/2005 | Qu et al. | 310/114 |
| 6,933,652 B2 * | 8/2005 | Higashino et al. | 310/260 |
| 6,943,466 B2 * | 9/2005 | Oohashi | 310/45 |
| 6,956,313 B2 | 10/2005 | El-Gabry et al. | |
| 7,030,528 B2 * | 4/2006 | Morgante | 310/112 |
| 7,154,191 B2 * | 12/2006 | Jansen et al. | 290/55 |
| 7,154,192 B2 * | 12/2006 | Jansen et al. | 290/55 |
| 2002/0017825 A1 * | 2/2002 | Oohashi et al. | 310/207 |
| 2005/0242678 A1 | 11/2005 | Rittmeyer | |
| 2006/0071575 A1 * | 4/2006 | Jansen et al. | 310/266 |

OTHER PUBLICATIONS

Asko Parviainen, "Axial Flux Permanent Magnet Generator for Wind Power Applications". Lappeenranta University of Technology, Finland, Pentti Kontkanen, Kylmatec Ky, Outokumpu, Finland, Cedrat, No. 47, Cedrat Technologies, Magsoft Corporation, Jan. 2005.

Haldemann, Johann, "Transpositions in Stator Bars of Large Turbogenerators", IEEE Transactions on Energy Conversion, vol. 19, No. 3, Sep. 2004.

* cited by examiner

*Primary Examiner*—Chandrika Prasad
(74) *Attorney, Agent, or Firm*—Ann M. Agosti

(57) ABSTRACT

This document discusses, among other things, a stator with transposition between the windings or coils. The coils are free from transposition to increase the fill factor of the stator slots. The transposition at the end connections between an inner coil and an outer coil provide transposition to reduce circulating current loss. The increased fill factor reduces further current losses. Such a stator is used in a dual rotor, permanent magnet machine, for example, in a compressor pump, wind turbine gearbox, wind turbine rotor.

16 Claims, 8 Drawing Sheets

PERMANENT MAGNET MACHINE WITH WINDINGS HAVING STRAND TRANSPOSITION

STATEMENT REGARDING FEDERALLY SPONSORED RESEARCH OR DEVELOPMENT

This invention was made with United States Government support awarded by the Department of Energy (DOE), Grant No. DE-AC36-99-GO10337. The United States Government has certain rights in this invention.

BACKGROUND

Dynamoelectric machines such as the large electrical generators include a rotor and a stator. The stator typically includes multiple phase windings, which are positioned in slots in a magnetic core. The movement of a rotor about an axis shifts a magnetic field that is associated with the rotor, thereby inducing a current to flow through each of the respective phase windings. However, the magnetic flux from the rotor and from the windings themselves may cause additional induced voltage and eddy currents in the windings. To combat this drawback, windings include multiple strands to minimize the eddy current loss. The flux in a generator is not uniform. Accordingly, the induced voltage varies from strand to strand, thereby causing excessive losses and heating. As found by Roebel, see for example U.S. Pat. No. 1,144,252 (hereby incorporated by reference), transposition of the strands minimizes this effect and reduces circulating currents and resultant heating. More specifically, transposing each strand through 360 degrees along the axial length of the strand inside the slots in the stator reduces circulating current. This in turn sacrifices space in the slot. However, transposition of strands in a winding is time consuming and expensive to manufacture. Moreover, transposition results in less winding material in a slot, which in turn requires larger slots and stator cores. Increasing the size and weight of a generator is not always possible when the generator is used in wind turbine applications.

BRIEF DESCRIPTION

This brief description is intended to provide an overview of the subject matter of the present patent application. It is not intended to provide an exclusive or exhaustive explanation of the invention. The detailed description is included to provide further information about the subject matter of the present patent application.

An embodiment of the present invention includes a permanent magnet machine with transposition between the windings or coils. In an embodiment, the windings are free from internal transposition. In an embodiment, the transposition occurs at the connections between the inner windings and the outer windings.

An embodiment of the present invention includes a permanent magnet machine include a permanent magnet rotor comprising an inner rotor component and an outer rotor component and at least one stator positioned between the inner rotor component and the outer rotor component including means for reducing circulating currents in the stator.

An embodiment of the present invention includes a stator for a electrical machine. The stator includes a core with a generally hollow cylindrical shape having a central inner opening, a plurality of inner windings adjacent the central inner opening, and a plurality of outer windings radially outwardly of the inner windings. The inner windings include a first strand and a second strand stacked on the first strand. The first strand is positioned closer to the inner opening than the second strand at the innermost turn of the inner winding. The outer windings include a third strand and a fourth strand stacked on the third strand. The fourth strand is positioned outward of the third strand at an outermost turn of the outer winding. The fourth strand is connected to the second strand at a first connection. The third stand is connected to the first strand at a second connection. In an embodiment, the first connection and the second connection provide a transposition between the connected inner winding and outer winding.

Embodiments of the present invention further include subsystems and methods as described in the present document.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
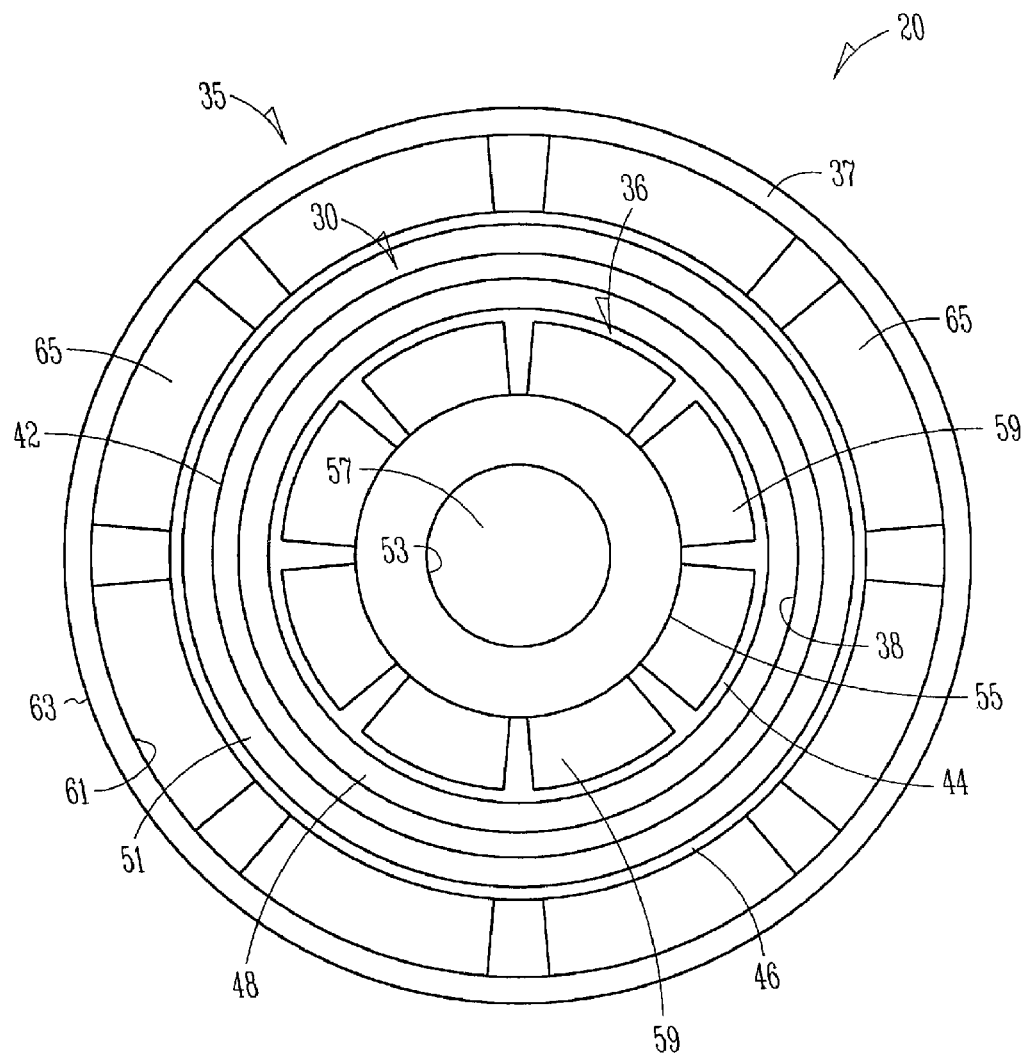
FIG. 1 shows an electric machine according to an embodiment of the present invention.

FIG. 1 shows an embodiment of a dual-rotor, permanent magnet machine 20 with a rotor-stator-rotor construction. That is, the machine 20 has a stator 30 and a permanent magnet rotor 35 having an inner rotor component 36 and an outer rotor component 37 with the stator 30 positioned between the inner rotor component 36 and the outer rotor component 37. The stator 30 has a generally hollow cylindrical shape defined by an inner surface 38 and an outer surface 42. The inner rotor component 36 is positioned in the hollow central space interior of the stator inner surface 38 and is separated therefrom by an inner air gap 44. The outer rotor component 37 is positioned outside of the stator outer surface 42 and is separated therefrom by an outer air gap 46. The stator 30 further includes a plurality of inner windings 48 positioned adjacent the inner gap 44 and a plurality of outer windings 51 positioned adjacent the outer gap 46. The windings 48, 51 are back-to-back windings in an embodiment. A body of the stator 30 is formed by a plurality of stacked laminations connected together in an embodiment. The body of the stator 30 is formed by any soft magnetic or ferromagnetic material such as a magnetic powdered material that is compressed together to form a unitary structure in an embodiment.

The rotor 35 has an inner rotor component 36 and an outer rotor component 37. The inner rotor component 36 includes an inner surface 53 and an outer surface 55. The rotor inner surface 53 defining a central aperture extending therethrough in which is fixed a shaft 57. The shaft 57 is fixed to a rotational motion supply such as a wind turbine gearbox or rotor, oil or gas powered turbine, or a hydropower supply, in an embodiment. The shaft 57 may also be connected to another rotational mechanical load, e.g., a ship propeller, generator or compressor pump. A plurality of radially polarized permanent magnets 59 are mounted to the outer surface 55. The outer rotor component 37 is positioned radially outwardly of the inner rotor component 36. The outer rotor component is also positioned radially outwardly of the stator 30. The outer rotor component 37 includes an inner surface 61 and an outer surface 63. A plurality of radially polarized permanent magnets 65 are fixed to the inner surface 61 and are adjacent the outer air gap 46. The inner, first air gap 44 is formed radially outwardly of the inner rotor magnets 59 of the inner rotor component 36 and radially inwardly of the inner windings 48 of the stator 30. The outer, second air gap 46 is formed radially inwardly of the outer rotor 65 and radially outwardly of the windings 51 of the stator 60. In an embodiment, the inner rotor component 36 and the outer rotor component 37 are a single integral rotor which causes the inner rotor component 36 and the outer rotor component 37 to rotate at the same speed in operation. In operation, the two rotor components 36, 37 magnetically interact with the stator 30. This causes the magnets 65, 59 drive a magnetic field within the stator 60 causing a back electromagnetic force to be induced in the windings 48, 51 wound around the stator. Since both the inner and outer surfaces of the stator are used as working surfaces, the present invention provides an improved generation of electrical power or torque per size of the machine 20. As a result, a higher winding usage will result in higher efficiency electrical power generation or higher torque density.

The dual-rotor, radial-flux permanent magnet machine 20 works like two conventional machines in series. The magnets 59, 65 are radially magnetized, but may be magnetized using blocked, magnetic can, tapered, parallel, or interleaved methods. In addition, the permanent magnets may be comprised of ferrite magnets or rare earth magnets.

Figure 2:
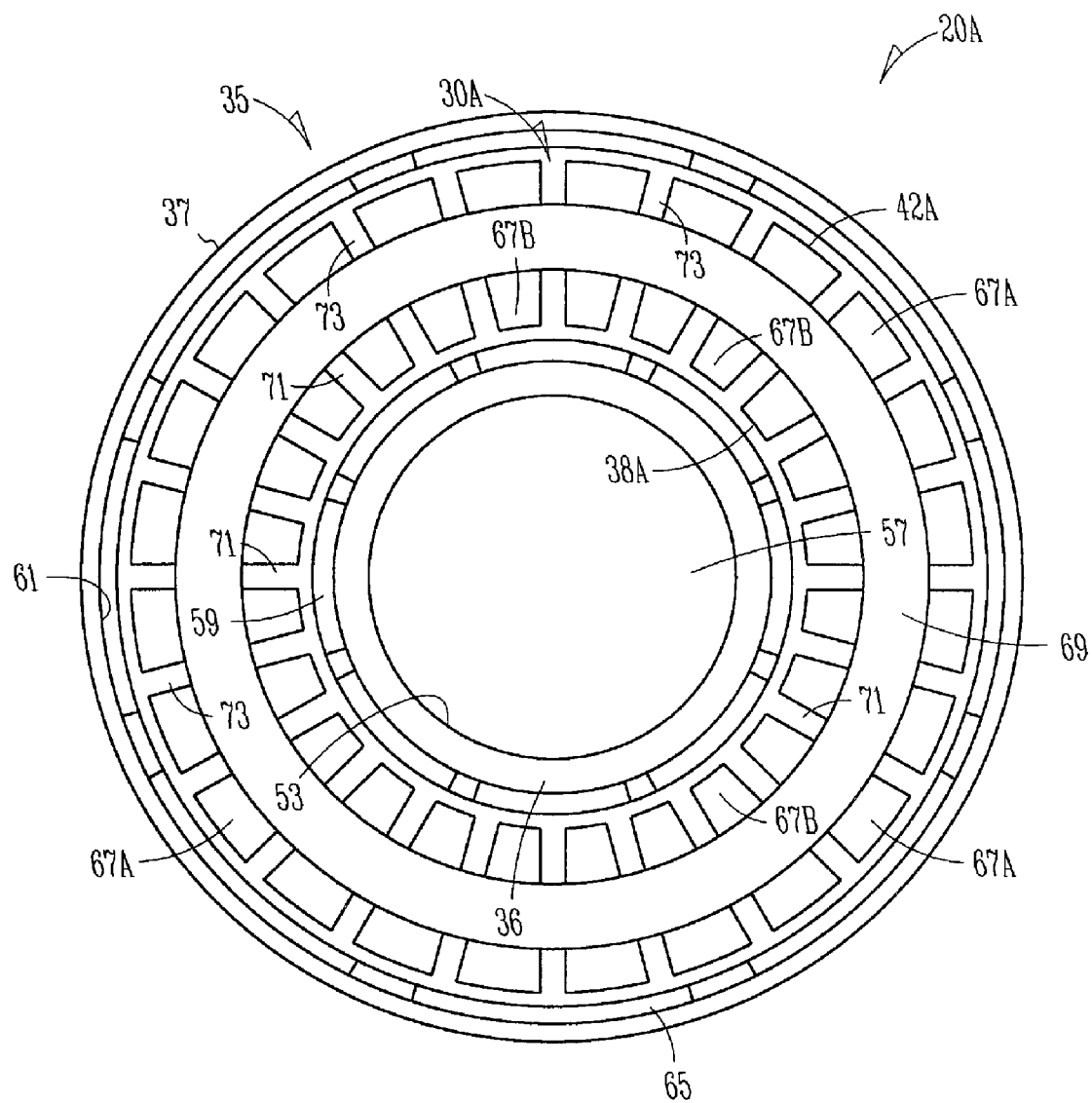
FIG. 2 shows an electric machine according to an embodiment of the present invention.

FIG. 2 shows an embodiment of a dual-rotor, radial-flux, slotted, surface-mounted permanent magnet machine 20A. The machine 20A includes a slotted stator 30A and a rotor 35 having inner and outer rotor components 36, 37. The machine 20A has a rotor-stator-rotor structure similar to that described above. The stator 30A has a generally cylindrical shape and is positioned intermediate the two rotor components 36, 37. The stator 30A has a radially inner surface 38A and a radially outer surface 42A. Teeth 67 are positioned radially outwardly and inwardly of a main body 69 of the stator 30A. The main body 69 of the stator 30A includes a plurality of stacked laminations that are connected together in an embodiment. The main body 69 of the stator 30A includes a compressed structure formed of a powdered material or a magnetic material. These teeth define inward slots 71 and outward slots 73. A plurality of polyphase windings are positioned around the teeth in the slots 71, 73. Windings in the inner slots 71 are considered inner windings. Windings in the outer slots are considered outer windings. In an embodiment, the windings are a plurality of flat stands that are non-transposed and are electrically insulted from each other.

Figure 3:
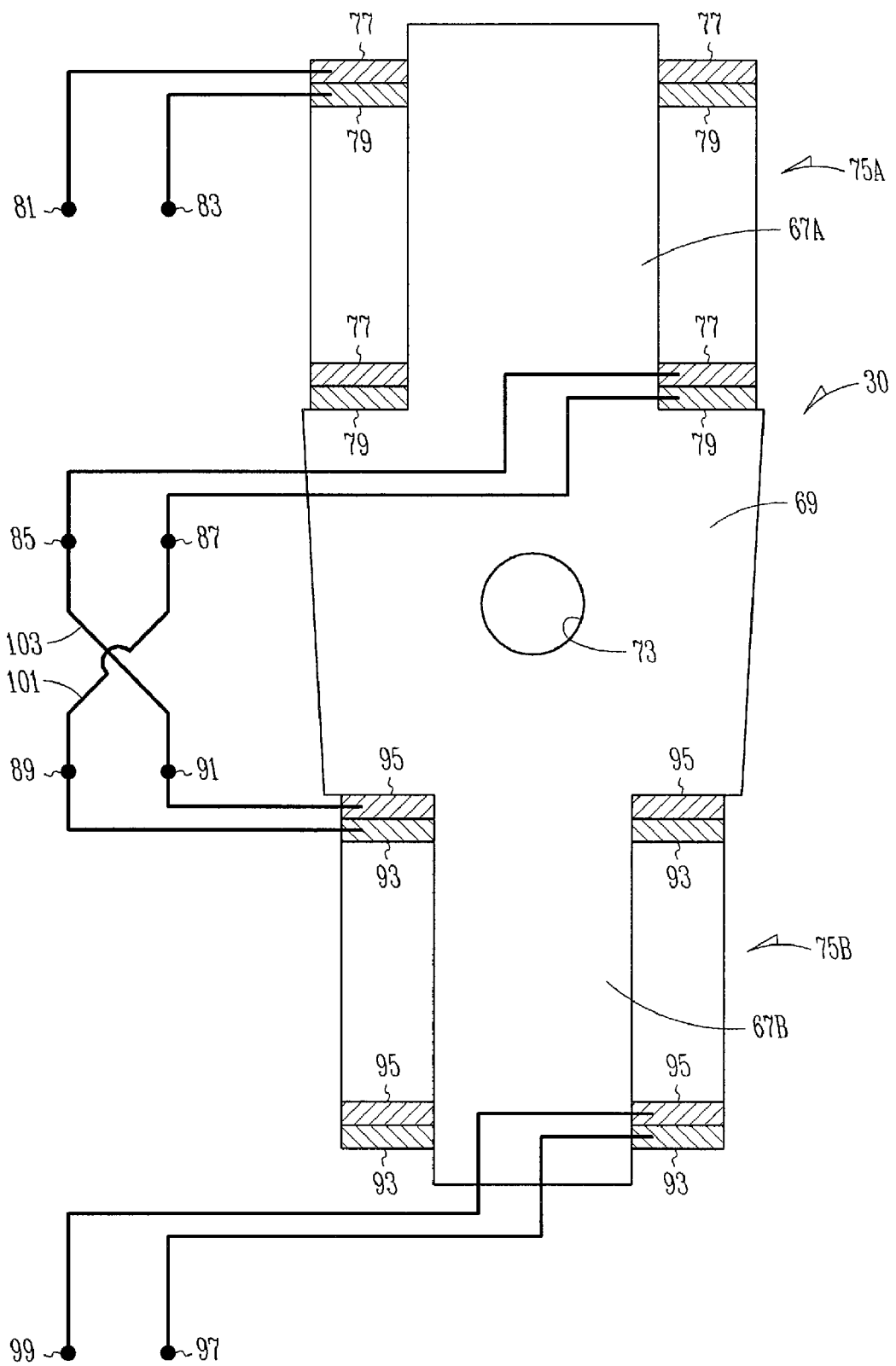
FIG. 3 shows a schematic view of a dual coil stator according to an embodiment of the present invention.

FIG. 3 shows a schematic, cross sectional, partial view of the stator 30 including stator body 69, radially outwardly extending tooth 67A, and radially inwardly extending tooth 67B. The tooth 67A and tooth 67B are both cantileved, in opposited radial directions, from the stator body 69. The stator body includes an aperture 73 therein, which in an embodiment may assist in cooling or in fabrication of the stator. The outer tooth 67A is radially aligned with the inner tooth 67B. An outer coil 75A is positioned around the outer tooth 67A. The outer coil 75A includes a first strand 77 that is positioned directly adjacent the outer rotor and a second strand 79 that is positioned beneath the first strand 77. The strands are then alternating stacked on one another to create a stacked winding. The strands 77, 79 are electrically insulated from each other. The strands 77, 79 together form one turn of the coil 75A. A first terminal 81 is connected to an end of the first strand 77. A second terminal 83 is connected to an end of the second strand 79. Terminals 81, 83 provide electrical connection from the outer coil to other windings of the stator 30 or to a further electrical system such as a electricity distribution system. Outer coil 75A is formed so that the top strand 77 remains on top of the bottom strand 79 at the inward end of the outer coil. In an embodiment, the outer coil is free of any transpositions within the slot. This allows the strands 77, 79 to be chosen to be essentially equal to the width of the slot in which they will be placed throughout the entire height of the slot. That is, there is no air gap created by transposing the strands in the slot. If the strands will share a slot, then the stands 77, 79 have a width equal to half the slot width. In an embodiment, the strands are copper bars having a rectangular cross section. The height of these bars is less than the width as shown in FIG. 3. In an embodiment, the strands stacked on each other do not equal the depth of the slot. The width of the strands may not equal the width of the slots. In an embodiment the width of a strand may be less than half the slot width. Thus the space in the slots may improve the cooling of the machine. The strands 77, 79 end at terminals 85, 87 positioned remote the terminals 81, 83 along the path of the coil and adjacent the stator body The inner coil 75B is positioned around the inner tooth 67B. The inner coil 75B includes a first strand 93 that is positioned directly adjacent the inner rotor and a second strand 95 that is positioned above the first strand 93. The strands 93, 95 are wound to form an alternating stack with the second strand 95 remaining above the first strand on each pair of strands. The strands 93, 95 are electrically insulated from each other. A first, inner terminal 89 is connected to an inner end of the first strand 93. A second, inner terminal 91 is connected to an end of the second strand 95. Terminals 89, 91 provide electrical connection from the inner coil to other windings of the stator 30. Inner coil 75B is formed so that the bottom strand 93 remains below the paired top strand 95 at the inward end of the inner coil. In an embodiment, the inner coil 75B is free of any transpositions within the slot. This allows the strands 93, 95 to be chosen to be essentially equal to the width of the slot in which they will be placed throughout the entire height of the slot. That is, there is no air gap created by transposing the strands 93, 95 in the slot. If the strands will share a slot with other windings, then the stands 93, 95 have a width essentially equal to half the slot width. In an embodiment, the strands stacked on each other do not equal the depth of the slot. The width of the strands may not equal the width of the slots. In an embodiment the width of a strand may be less than half the slot width. In an embodiment, the strands 93, 95 are copper bars having a rectangular cross section. The height of these bars is less than the width as shown in FIG. 3.

The terminal 85 of the outer coil strand 77, which is the closest strand to the outer rotor, is connected to the terminal 91 of inner coil strand 95, which is the remote strand relative to strand 93 and the inner rotor. The terminal 87 of the outer coil strand 79, which is the remote strand relative to the outer rotor and strand 77, is connected to the terminal 89 of inner coil strand 93, which is the closest strand relative to the inner rotor. As shown in FIG. 3, the topmost outer strand 77 is connected to the topmost inner strand 95. The bottommost outer strand 79 is connected to the bottommost inner strand 93. This connection provides a type of transposition of the strands between the pair of radially aligned outer and inner coils 75A, 75B. Accordingly, the connection between the two strands 93, 95 of the inner coil 75B and the strands 77, 79 of the outer coil 75A provide transposition to reduce circulating currents. Moreover, the use of multiple strands in each coil or winding reduces eddy currents. This will improve the efficiency of the machine 20.

The illustration shown in FIG. 3 is one part of a stator 30. A plurality of these aligned inner and outer coils are positioned side-by-side to define the cylindrical stator 30. In an embodiment, there are 96 inner and outer coil pairs as shown in FIG. 3 for a total of 192 coils in the machine 20.

Figure 4:
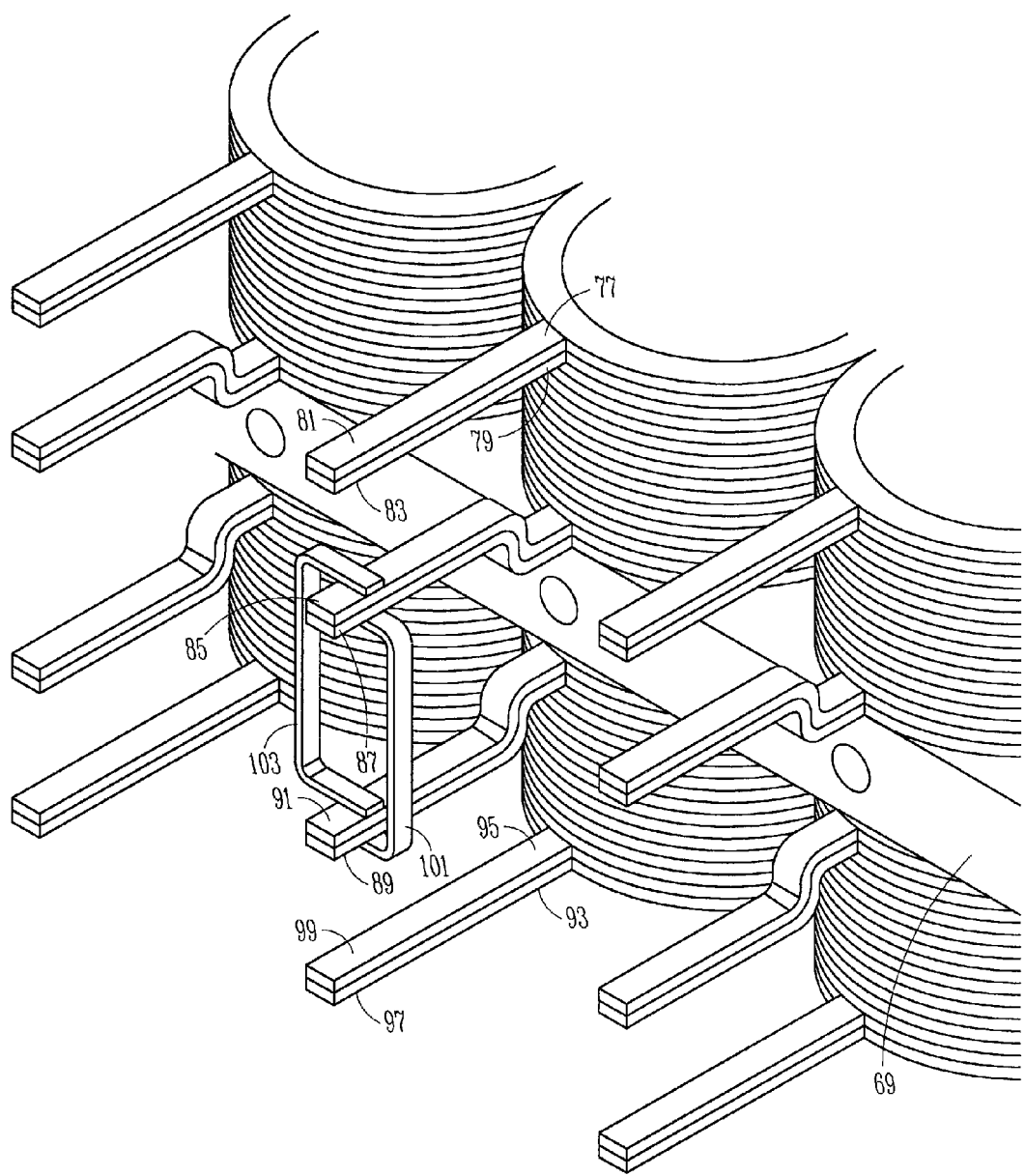
FIG. 4 shows a further view of a dual coil stator according to an embodiment of the present invention.

FIG. 4 shows a further schematic view of a part of a stator 30. The same elements as shown in FIG. 3 are designated by the same reference number. The terminal 85 associated with the topmost, upper coil strand 77 and the terminal 91 associated with the topmost, lower coil strand 95 are connected by a jumper 103. The jumper 103 is a rigid metal, U-shaped bar. Jumper 103 has an upper leg extending above and connected to the terminal 85, a lower leg extending above and connected to the terminal 91 and a radially extending (relative to the stator) web connecting the upper and lower legs. In an embodiment, the legs of the jumper 103 are welded to the terminals 85, 91, respectively. The terminal 87 associated with the lower, upper coil strand 79 and the terminal 89 associated with the lower, lower coil strand 93 are connected by a jumper 101. The jumper 101 is a rigid metal, U-shaped bar. Jumper 101 has an upper leg extending below and connected to the terminal 87, a lower leg extending below and connected to the terminal 89 and a radially extending (relative to the stator) web connecting the upper and lower legs. In an embodiment, the legs of the jumper 101 are welded to the terminals 87, 89, respectively. These jumpers 101, 103 provide a transposition of the windings when the inner windings 75B are connected to the outer windings 75A.

Figure 5:
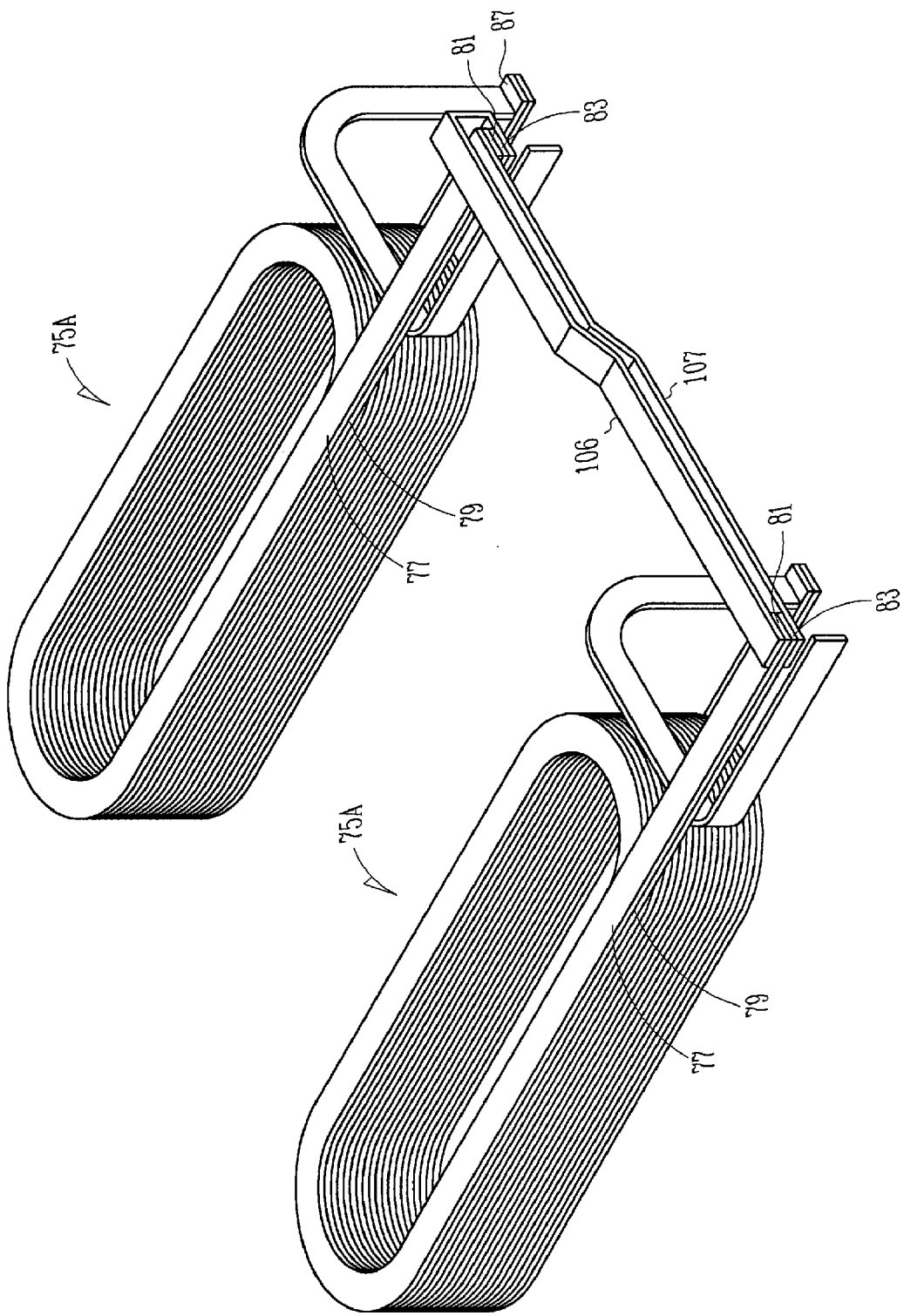
FIG. 5 shows a view of adjacent coils stator according to an embodiment of the present invention.

FIG. 5 shows a perspective view of an embodiment of two coils on one of the outer stator or inner stator. The two coils will be described as they are part of the outer stator, it will be understood that the two adjacent coils on the inner stator are connected in the same manner and have similar structure. Coils 75A are positioned in adjacent slots 73 in the stator body in an embodiment. In another embodiment, the coils are not positioned in adjacent slots in the stator body. The coils 75A are formed on stacked bar strands 77, 79 wound around the teeth of the stator. The strands 77, 79 are insulated from each other. While the embodiment is described as a stacked or strand-over-strand coil construction, it will be understood that the coils could be made in a side-by-side construction to fill the slots in the stator In order to generate multi-phase electrical power the windings must be connected together. Rigid connectors 106 and 107 respectively connect the top strands 77 and bottom strands 79 of the side-by-side windings 75A.

Figure 6:
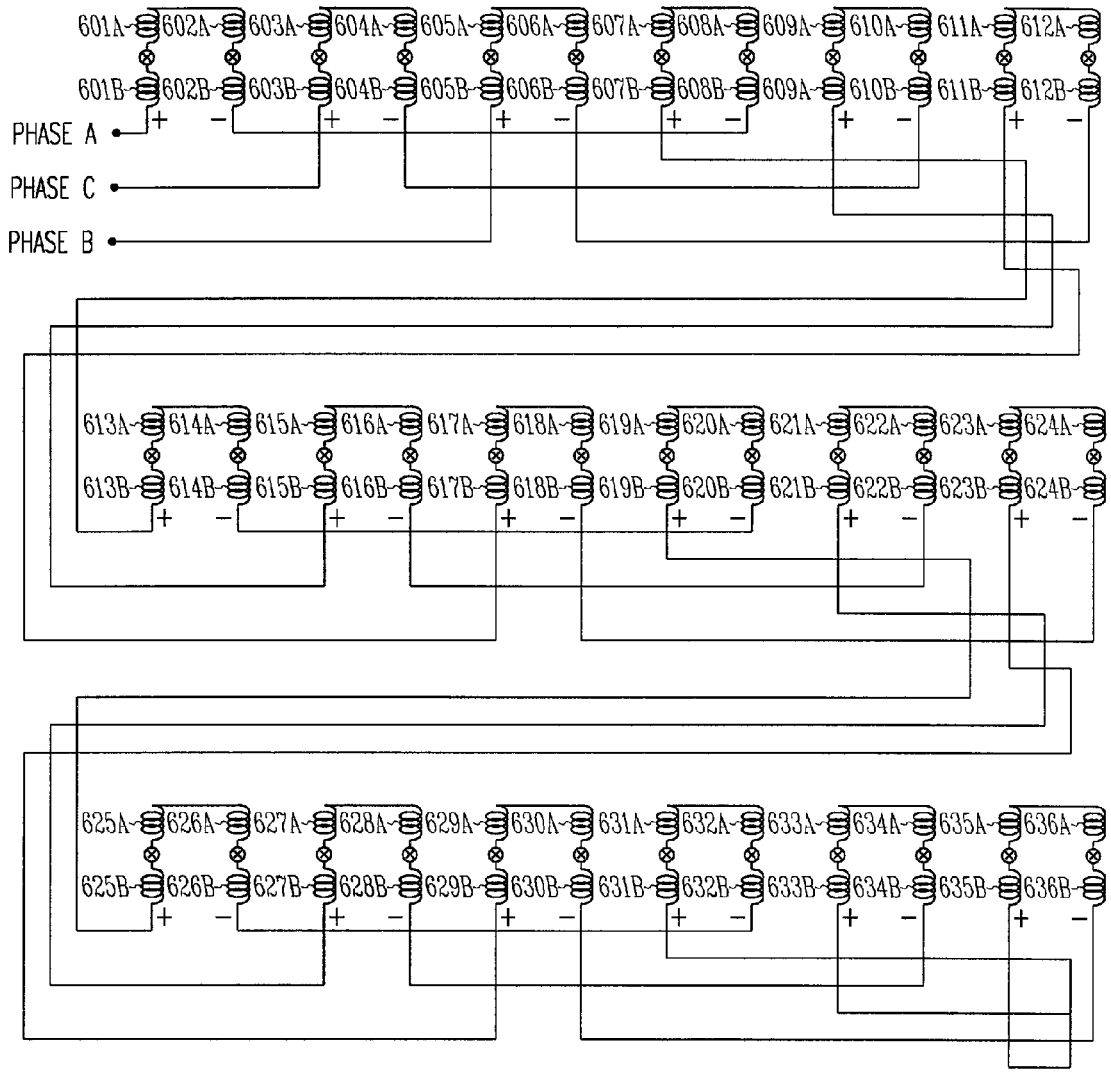
FIG. 6 shows a view of coil connections according to an embodiment of the present invention.
Figure 7:
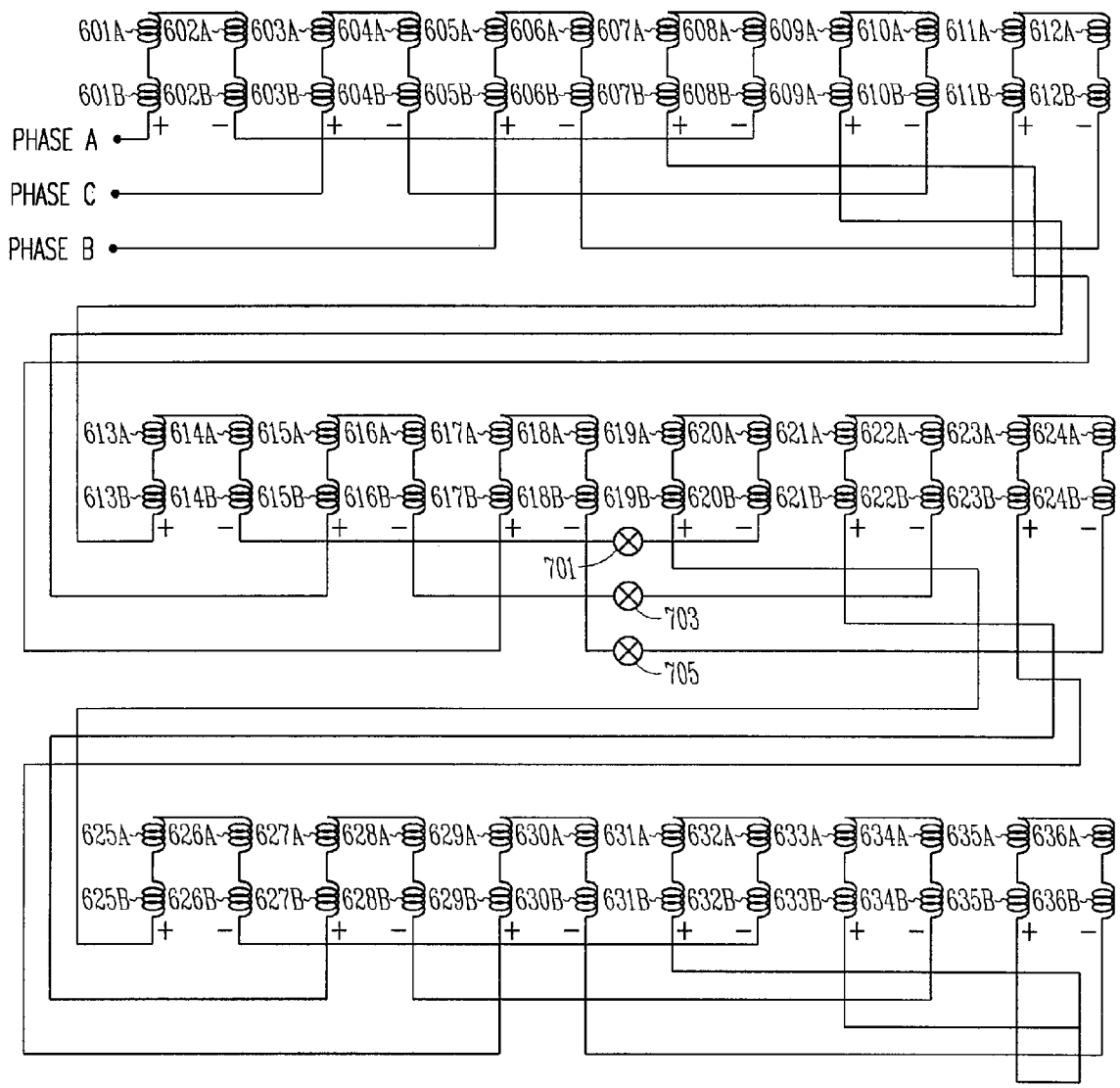
FIG. 7 shows a view of coil connections according to an embodiment of the present invention.
Figure 8:
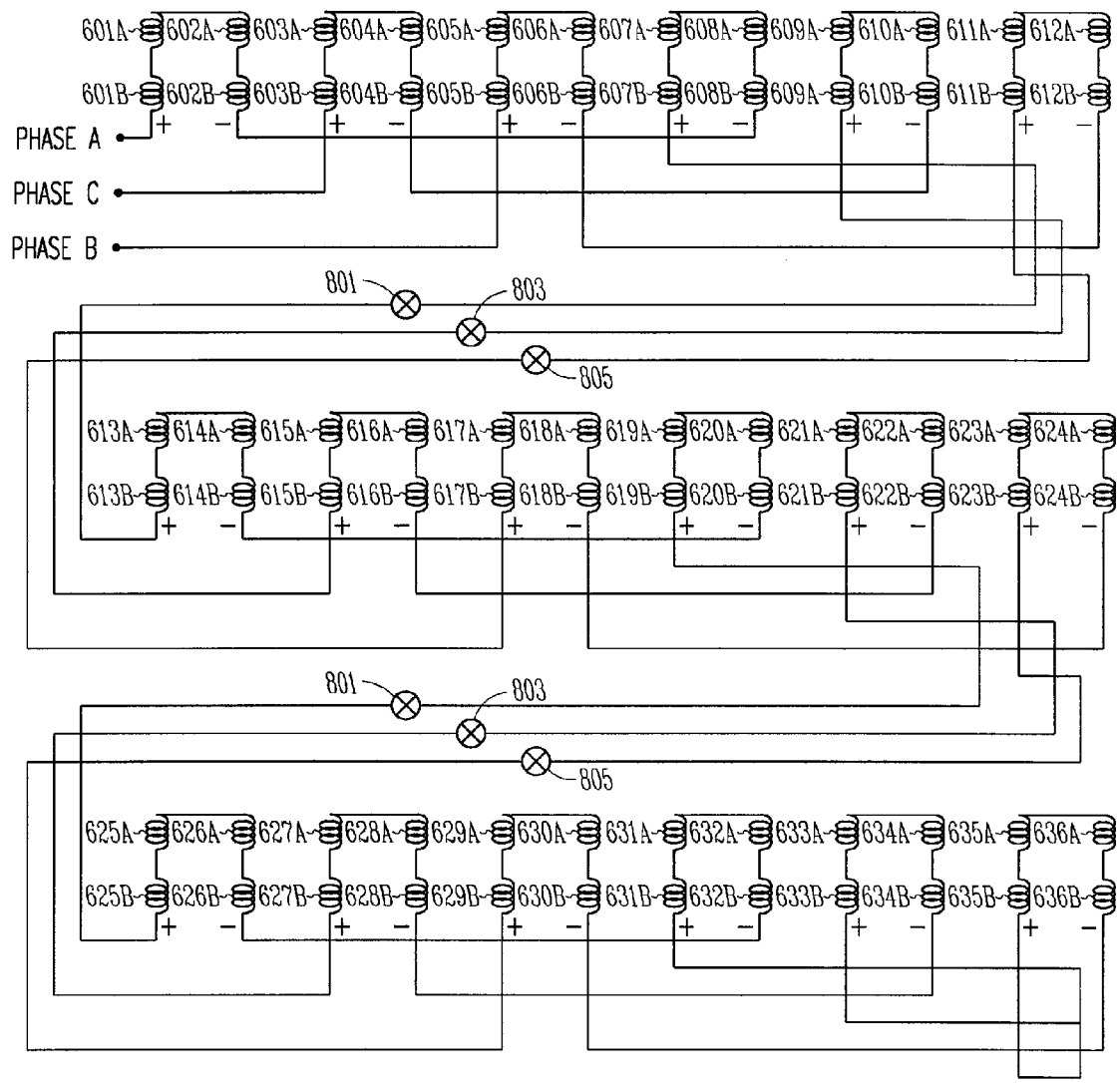
FIG. 8 shows a view of coil connections according to an embodiment of the present invention.

FIGS. 6-7 show a schematic of a three phase machine according to an embodiment of the present invention. A plurality of pairs coils 601A, 601B; 602A, 602B; 603A, 603B; . . . 636A, 636B are shown in FIGS. 6-8, that is, each numerical designation 601-636 includes an inner coil, indicated with the suffix "A," and an outer coil, indicated with a suffix "B," as described herein. Each coil includes a plurality of wound strands. In an embodiment, there are two stands, which can be bar type strands to essentially fill the respective slot with conducting material as described herein. In an embodiment for a three phase electrical machine, coil pairs 601, 602, 607, 608, 613, 614, 619, 620, 625, 626, 631, and 632 form a circuit for a first phase. Coil pairs 603, 604, 609, 610, 615, 616, 621, 622, 627, 628, 633, and 634 form a circuit for a second phase. Coil pairs 605, 606, 611, 612, 617, 618, 623, 624, 629, 630, 635, and 636 form a circuit for one phase. FIG. 6 shows an embodiment, where transposition is natural transposition that occurs when the inner coil and outer coil of the machine 20 are connected such that the top strand of the outer coil, which is closest to the outer, is connected to the top strand of the inner coil, which strand is not the closest to the inner rotor. Accordingly, all connections from the inner coils to the outer coils are strand to strand connections. These strands must be insulated from each other. The connections of the inner coils to each other are turn to turn connections. In an embodiment, these connections are welded together and need not be insulated. The connections of the outer coils to each other are turn to turn connections. In an embodiment, these connections are welded together and need not be insulated.

FIG. 7 shows a further embodiment, with a transposition 701, 703, or 705 occurring in each of the phase circuits. That is, in a connection between a coil pair in the middle third of coils, the respective connection for each phase is transposed. In an example, the strands within a connection are physically weaved together to transpose the connection. In an embodiment, the connection transposition occurs at the middle of the windings for each phase. The transposition 701, 703, or 705 occurs after six coil pairs in each phase. In this embodiment, there are two strands per coil, accordingly, there need be only one transposition. In an embodiment, the transposition 701 is between adjacent coil pairs, e.g., between inner coil 614A and inner coil 620A. In an embodiment, the transposition 703 is between adjacent coil pairs, e.g., between inner coil 616A and inner coil 622A. In an embodiment, the transposition 705 is between adjacent coil pairs, e.g., between inner coil 618A and inner coil 624A. In an embodiment, the strands that comprise the coils are multi-strand coil windings that have insulation between the strands.

FIG. 8 shows a further embodiment of connection transpositions 801, 803, 805, 811, 813, and 815. In a three phase electrical machine, transpositions 801, 811 are in the first phase circuit. Transpositions 803, 813 are in the second phase circuit Transpositions 805, 815 are in the third phase circuit. The first set of transpositions 801, 803, 805 separate the first third of coil pairs from the second third of coil pairs. The second set of transpositions 811, 813, 815 separate the second third of coil pairs from the final third of coil pairs. The strands in the coils in the FIG. 8 embodiment include three strands per coil and hence requires two transpositions. The three strand coil requires that the transpositions be different relative to each other. There are top, middle, and bottom strands for both the inner coil and the outer coil. The connections between the coils are between either the inner coils or outer coils Connections 801, 803, 805 are identical and are as follows. The top strand of the left coil is connected to the middle strand of the right coil. The middle strand of the left coil is connected to the bottom strand of the right coil. The bottom strand of the left coil is connected to the top strand of the right coil. In an alternate embodiment, the transposition strand connects are top left strand to bottom right strand, middle left strand to top right strand, and bottom left strand to middle right strand. Connection transpositions as used herein occur between the coils and not within the slots to ensure the maximum amount of coil material in the slots of the stator. In this embodiment, the strands that comprise the coils are multi-strand windings that have insulation between the strands.

The structures and methods of embodiments described herein provide an improved winding that may result in a reduction of circulating current loss. Circulating current loss occurs due to the difference in voltages in individual strands in a coil. Such a loss reduces machine efficiency, for example generator electricity output efficiency, increases thermal stress. Hence, there is increased cost of energy production or increased energy consumption. Reduction of these losses is desirable in generators for use with wind turbines. The transpositions are provided between the coils, e.g., pairs of inner and outer coils to reduce circulating current. Moreover, removing transpositions from within windings or coils reduces the cost of manufacturing coils. A further improvement is the nearly complete fill of stator slots by not having transpositions in the coils. This reduces DC copper losses in the machine. That is, the mass of winding material, e.g., copper, is greater in embodiments of the present invention relative to conventional, in coil transposed machine structures. Accordingly, the mass of a machine according to the present invention would be less than a convention machine for the same output power. Mass is an important design criteria in permanent magnet wind turbines as the generator is located near or in the hub at the top of a tower.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

We claim:

1. A permanent magnet machine, comprising:
    at least one permanent magnet rotor comprising an inner rotor component and an outer rotor component;
    at least one stator positioned between the inner rotor component and the outer rotor component, the stator comprising inner slots adjacent the inner rotor component and outer slots adjacent the outer rotor component;
    a plurality of polyphase inner windings associated with the inner slots, wherein at least one inner winding includes a first inner strand and a second inner strand, wherein the first inner strand is closer to the inner rotor component than the second inner strand,
    a plurality of polyphase outer windings associated with the outer slots, wherein at least one outer winding includes a first outer strand and a second outer strand, wherein the first outer strand is closer to the outer rotor component than the second outer strand,
    wherein the first inner strand is connected to the second outer strand at a first connection, and
    wherein the second inner strand is connected to the first outer strand at a second connection, and
    wherein the first and second connections provide transposition between the at least one inner winding and the at least one outer winding.

2. The machine of claim 1, wherein the first outer strand and the second outer strand are each a flat bar radially outwardly stacked on each other.

3. The machine of claim 1, wherein the first inner strand and the second inner strand are each a flat bar radially outwardly stacked on each other.

4. The machine of claim 1, wherein at least one of the first inner strand, the second inner strand, first outer strand, the second outer strand comprise copper.

5. A permanent magnet machine, comprising:
    at least one permanent magnet rotor comprising an inner rotor component and an outer rotor component;
    at least one stator positioned between the inner rotor component and the outer rotor component, the stator comprising a core, a plurality of inner windings, and a plurality of outer windings, wherein at least one inner winding includes a first inner strand adjacent the inner rotor component and a second inner strand adjacent the first inner strand, and wherein at least one outer winding includes a first outer strand adjacent the outer rotor component and a second outer strand adjacent the first outer strand, and wherein the first inner strand is connected to the second outer strand at a first connection, and wherein the second inner strand is connected to the first outer strand at a second connection, and wherein the first connection and the second connection provide transposition to reduce circulating currents in the stator.

6. The machine of claim 5, wherein both the inner windings and the outer windings comprise stacked bars.

7. The machine of claim 6, wherein the stator includes inner slots that are completely filled by the inner, stacked bar winding, and wherein the stator includes outer slots that are completely filled by the outer, stacked bar winding.

8. A stator for a permanent magnet generator, comprising:
a core with a generally hollow cylindrical shape having a central inner opening;
a plurality of inner windings adjacent the central inner opening, at least one of the inner windings including a first strand and a second strand stacked on the first strand, the first strand being closer to the inner opening than the second strand at the innermost turn of the inner winding;
a plurality of outer windings radially outwardly of the inner windings, at least one of the outer windings including a third strand and a fourth strand stacked on the third strand, the fourth strand being outward of the third strand at an outermost turn of the outer winding, the fourth strand being connected to the second strand at a first connection, and the third stand being connected to the first strand at a second connection,
wherein the first connection and the second connection provide transposition between the a first coil and a second coil.

9. The stator of claim 8, wherein the third strand and fourth strand are each a flat bar radially outwardly stacked on each other.

10. The stator of claim 8, wherein the first strand and the second strand are each a flat bar radially outwardly stacked on each other.

11. The stator of claim 8, wherein at least one of the first strand, the second strand, the third outer strand, and the fourth strand comprise copper.

12. The stator of claim 8, wherein the inner windings further include inner windings of a first phase connected together.

13. The stator of claim 12, wherein the outer windings further include outer windings of a first phase connected together.

14. The stator of claim 8, wherein the first coil includes a first strand, a second strand, and a third strand, each separated by an insulator, the first strand being proximal a rotor, the second strand being intermediate the first strand and the third strand, the third strand being distal a rotor, and
wherein the second coil includes a fourth strand, a fifth strand and a sixth strand, each separated by an insulator, the fourth strand being proximal a rotor, the fifth strand being intermediate the fourth strand and the sixth strand, the sixth strand being distal a rotor.

15. The stator of claim 14, wherein the first strand is connected to the sixth stand, wherein the second strand is connected to the fourth strand, and wherein the third strand is connected to the fifth strand.

16. The stator of claim 8, wherein the first coil includes a first strand and a second strand, the first strand being proximal a rotor and the second strand being distal a rotor, and wherein the second coil includes a third strand and a fourth strand coil, the third strand being proximal a rotor and connected to the second strand, and the fourth strand being distal a rotor and connected to the first strand.

* * * * *

UNITED STATES PATENT AND TRADEMARK OFFICE
CERTIFICATE OF CORRECTION

| | | |
|---|---|---|
| PATENT NO. | : 7,521,835 B2 | Page 1 of 1 |
| APPLICATION NO. | : 11/426756 | |
| DATED | : April 21, 2009 | |
| INVENTOR(S) | : Qu et al. | |

It is certified that error appears in the above-identified patent and that said Letters Patent is hereby corrected as shown below:

In Column 4, Line 25, delete "cantileved," and insert -- cantilevered, --, therefor.

In Column 4, Line 26, delete "opposited" and insert -- opposite --, therefor.

In Column 9, Line 30, in Claim 8, delete "the a first coil" and insert -- a first coil --, therefor.

Signed and Sealed this
Fourteenth Day of June, 2011

David J. Kappos
*Director of the United States Patent and Trademark Office*